(12) United States Patent
Parker et al.

(10) Patent No.: US 12,388,709 B2
(45) Date of Patent: Aug. 12, 2025

(54) RANGE-VARIABLE INTENT DEFINITION AND OPERATION

(71) Applicant: Microsoft Technology Licensing, LLC, Redmond, WA (US)

(72) Inventors: Ronald Mark Parker, Manchester, MA (US); Michael Anthony Brown, McKinney, TX (US); Bahareh Sadeghi, Vancouver, WA (US); Mark Gordon Libby, Groton, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/721,847

(22) Filed: Apr. 15, 2022

(65) Prior Publication Data
US 2023/0336415 A1    Oct. 19, 2023

(51) Int. Cl.
*H04L 41/0816* (2022.01)
*H04L 41/08* (2022.01)
(Continued)

(52) U.S. Cl.
CPC ...... *H04L 41/0816* (2013.01); *H04L 41/0836* (2013.01); *H04L 41/0883* (2013.01); *H04L 43/065* (2013.01)

(58) Field of Classification Search
CPC ............. H04L 41/0816; H04L 41/0836; H04L 41/0883; H04L 43/065
See application file for complete search history.

(56) References Cited

U.S. PATENT DOCUMENTS 11,296,953 B1 * 4/2022 Ponnuswamy ..... H04L 41/5009
11,805,015 B2 * 10/2023 Sridhar ............... H04L 41/5009
(Continued)

FOREIGN PATENT DOCUMENTS

CN    110461011 A    11/2019
EP    3840297 A1 *    6/2021    ......... H04L 41/0816
(Continued)

OTHER PUBLICATIONS

Translation of WO-2020164490-A1, 49 pages. (Year: 2020).*
(Continued)

*Primary Examiner* — Patrice L Winder
(74) *Attorney, Agent, or Firm* — ArentFox Schiff LLP

(57) ABSTRACT

Described are examples for providing intent based network configuration with intent expectations including prioritized goals. A system for network configuration includes a network management function configured to receive an intent including requirements, goals, and constraints for a network and generate an intent expectation including a set of prioritized goals based on the intent. An infrastructure service management (ISM) system is configured to: receive the intent expectation from the network management function; select at least one of the prioritized goals as an active target; configure computing resources to satisfy at least the active target; and report the active target and a configuration status to the network management function. The ISM may monitor a status of the computing resources and select a higher priority goal that can be satisfied or select a lower priority goal in the case of resource or performance degradation.

15 Claims, 7 Drawing Sheets

(51) Int. Cl.
   *H04L 41/0823*   (2022.01)
   *H04L 43/065*   (2022.01)

(56) References Cited

U.S. PATENT DOCUMENTS

| | | | | |
|---|---|---|---|---|
| 2019/0150017 | A1* | 5/2019 | Yao | H04L 65/80 |
| | | | | 370/252 |
| 2020/0154292 | A1* | 5/2020 | Bor-Yaliniz | H04L 41/0893 |
| 2020/0351167 | A1* | 11/2020 | Sharma | H04L 41/0806 |
| 2021/0266269 | A1* | 8/2021 | McBride | H04L 41/0816 |
| 2021/0350263 | A1 | 11/2021 | Koneru et al. | |
| 2021/0352534 | A1* | 11/2021 | Tiwari | H04L 41/5009 |
| 2021/0377111 | A1 | 12/2021 | Xu | |
| 2022/0014449 | A1* | 1/2022 | Mwanje | H04L 41/0823 |
| 2022/0029896 | A1* | 1/2022 | Mwanje | H04L 41/0823 |
| 2022/0272002 | A1* | 8/2022 | Li | H04L 41/28 |
| 2022/0386179 | A1* | 12/2022 | Dhammawat | H04W 28/24 |
| 2023/0049513 | A1* | 2/2023 | Dawson | H04L 67/75 |

FOREIGN PATENT DOCUMENTS

| | | | | | |
|---|---|---|---|---|---|
| WO | WO-2020164490 | A1 * | 8/2020 | | H04L 41/0806 |
| WO | WO-2020200033 | A1 * | 10/2020 | | H04L 41/0896 |
| WO | WO-2023274508 | A1 * | 1/2023 | | |

OTHER PUBLICATIONS

Translation of WO-202000033-A1, 48 pages. (Year: 2020).*
C. Frenzel, S. Lohmüller and L. C. Schmelz, "Dynamic, context-specific SON management driven by operator objectives," 2014 IEEE Network Operations and Management Symposium (NOMS), Krakow, Poland, 2014, pp. 1-8, doi: 10.1109/NOMS.2014.6838256. (Year: 2014).*
"International Search Report and Written Opinion issued in PCT Application No. PCT/US2023/013365", Mailed Date: May 12, 2023, 14 Pages.
Szilágyi, "I2BN: Intelligent Intent Based Networks", In Journal of ICT Standardization, vol. 9, Issue 2, May 31, 2021, pp. 159-200.

* cited by examiner

RANGE-VARIABLE INTENT DEFINITION AND OPERATION

BACKGROUND

A radio access network (RAN) may provide multiple user devices with wireless access to a network. The user devices may wirelessly communicate with a base station, which forwards the communications towards a core network. A core network may include multiple nodes or functions. For example, a 5G core network may include one or more Access and Mobility Management Functions (AMFs), Session Management Functions (SMFs), and a User Plane Functions (UPFs). For instance, the AMF may be a control node that processes the signaling between the UEs and the core network. Generally, the AMF provides quality of service (QoS) flow and session management. All user Internet protocol (IP) packets are transferred through the UPF. The UPF provides UE IP address allocation as well as other functions. The UPF may be connected to IP Services. The IP Services may include the Internet, an intranet, an IP Multimedia Subsystem, a packet switched (PS) Streaming Service, and/or other IP services.

A virtualized radio access network may utilize datacenters with generic computing resources for performing RAN processing for network functions. For example, instead of performing PHY and MAC layer processing locally on dedicated hardware, a virtualized radio access network may forward radio signals from the radio units to an edge datacenter for processing and similarly forward signals from the edge datacenter to the radio units for wireless transmission. As another example, core network functions may be implemented on generic cloud resources at various datacenters. Because the network datacenters utilize generic computing resources, a virtualized RAN may provide scalability and fault tolerance for network processing. Conventionally, whether using dedicated hardware or more generic computing resources, network configuration has been performed by pushing a network configuration down to lower level management functions until each network function is configured.

In complex systems, such as cellular networks in general and in cloud-based virtualized deployments specifically, variations in system resources and network conditions may result in many interactions between management functions and infrastructure management leading to a suboptimal performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a system for network configuration includes a network management function configured to: receive an intent including requirements, goals, and constraints for a network; and generate an intent expectation including a set of prioritized goals based on the intent. The system includes an infrastructure service management (ISM) system configured to: receive the intent expectation from the network management function; select a highest prioritized goal of the set of prioritized goals that can be satisfied by the computing resources controlled by the ISM system as an active target based on a comparison between a status of the computing resources to parameters for each of the set of prioritized goals; and report the active target and a configuration status to the network management function.

In another example, a computer-implemented method for network configuration includes receiving an intent expectation including a set of prioritized goals from a network management function. The method includes selecting a highest prioritized goal of the set of prioritized goals that can be satisfied by a set of computing resources as an active target based on a comparison between a status of the computing resources to parameters for each of the set of prioritized goals. The method includes configuring computing resources to satisfy at least the active target of the intent expectation. The method includes reporting the active target and a configuration status to the network management function.

In another example, a non-transitory computer-readable medium includes computer executable instructions for network configuration. The non-transitory computer-readable medium includes instructions to receive an intent expectation including a set of prioritized goals from a network management function. The non-transitory computer-readable medium includes instructions to select a highest prioritized goal of the set of prioritized goals that can be satisfied by a set of computing resources as an active target based on a comparison between a status of the computing resources to parameters for each of the set of prioritized goals. The non-transitory computer-readable medium includes instructions to configure computing resources to satisfy at least the active target of the intent expectation. The non-transitory computer-readable medium includes instructions to report the active target and a configuration status to the network management function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
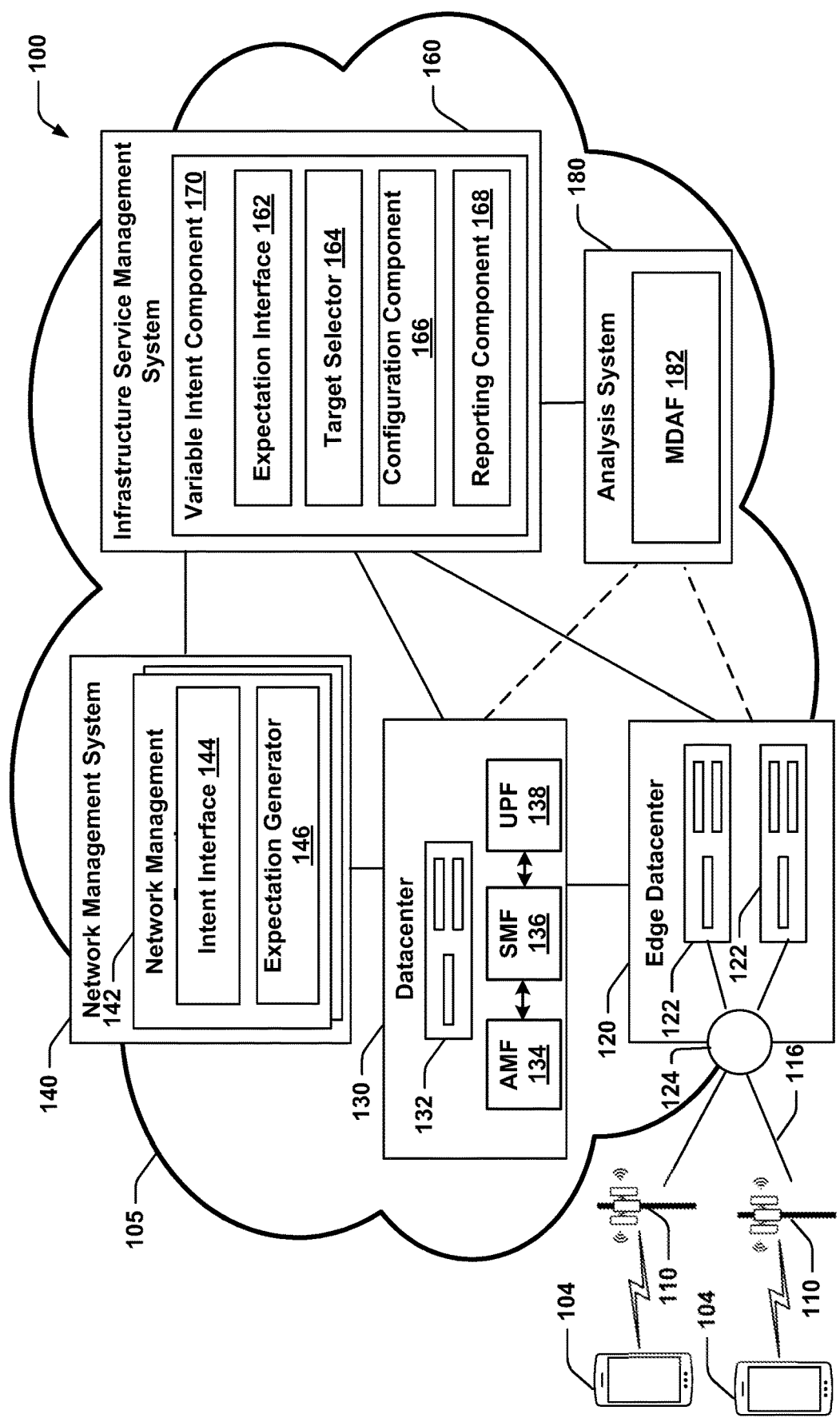
FIG. 1 is a diagram of an example of an architecture for network management of a virtualized radio access network (RAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

The concept of intent driven network management allows a client to specify a specific goal (or intent target) to be satisfied within a set of specific expectations (also referred to as contexts). The server, e.g., the intent-handler or the service provider, provides the client with updates regarding the status of the intent. If the server cannot achieve the goal specified as the intent, then the server may reject the intent. If a satisfied intent is degraded and no longer fully satisfied, the server notifies the client of the degradation. The client then may choose to update the intent and set a new goal.

In complex systems, such as cellular networks in general and in cloud-based virtualized deployments specifically, the variations in system resources and network conditions may result in many interactions between the intent-client and intent-server leading to a suboptimal performance. A proposal to address this issue is to enable the intent-server to provide predictive behavior; the predictive behavior information enables the intent-client to create intents with a higher chance of successful satisfaction. However, the predictive capability is complicated and limited in its performance and there is a limit to the extent of its scope and hence applicability.

In an aspect, this disclosure describes various examples related to network management for virtualized radio access networks (RANs) using intent based interfaces with prioritization of goals. An intent-client may provide an intent expectation including a set of prioritized goals. An intent expectation may also be referred to as an intent target or intent declaration. An intent-server may select one of the goals as an active target and configure computing resources to satisfy at least the active target. For example, in the case of a virtualized RAN, a network management function may receive an intent including requirements, goals, and constraints for a network. For example, the intent may be received from a user (e.g., network operator) or a higher level network management function. The network management function may generate an intent expectation including a set of prioritized goals based on the intent. The network management function may provide the intent expectation to an infrastructure services management (ISM) system such as a container infrastructure services management (CISM) system that controls cloud resources. The ISM system may receive the intent expectation from the network management function and select at least one of the prioritized goals as an active target. The ISM system may configure computing resources to satisfy at least the active target. The ISM system may report the active target and configuration status to the network management function.

In some implementations, the ISM system may monitor performance of the configured computing resources. For example, the ISM system may include or communicate with an analysis system to determine whether the active target is being satisfied or whether a higher prioritized goal could be satisfied. The ISM system may select a lower prioritized goal when the active target is not satisfied or select a higher prioritized goal when possible. The ISM system may report a new active target. Accordingly, the ISM system may adapt the active target without a need for the network management function to provide a new intent.

In an aspect, the inclusion of prioritized goals within an intent expectation may improve performance of network management functions and the network itself. For example, by including prioritized goals within an intent expectation, the overhead of communications between higher level network management functions and lower level network management functions or infrastructure management services may be reduced. That is, the fewer rounds of communications of failed intents may be needed to arrive at an operable configuration. As another example, inclusion of prioritized goals within an intent expectation moves decisions closer to resources, which may provide for configuration that improve network performance. For instance, if an ISM system is given more flexibility for allocating resources using prioritized goals, the ISM may be able to optimize for desired characteristics such as performance metrics or cost, whereas a higher level network management function may not be able to control for such characteristics. Similarly, the use of prioritized goals may allow a reconciliation loop to operate closer to the resources. For example, the ISM system may detect degraded performance resulting in selection of a lower priority goal or detect ability to satisfy a higher priority goal without need to receive an updated intent from a higher level management function. Accordingly, the network may be able to adapt more quickly to network conditions at the ISM using the prioritized goals in comparison to a larger reconciliation loop involving updated intents from higher level management functions.

Figure 3:
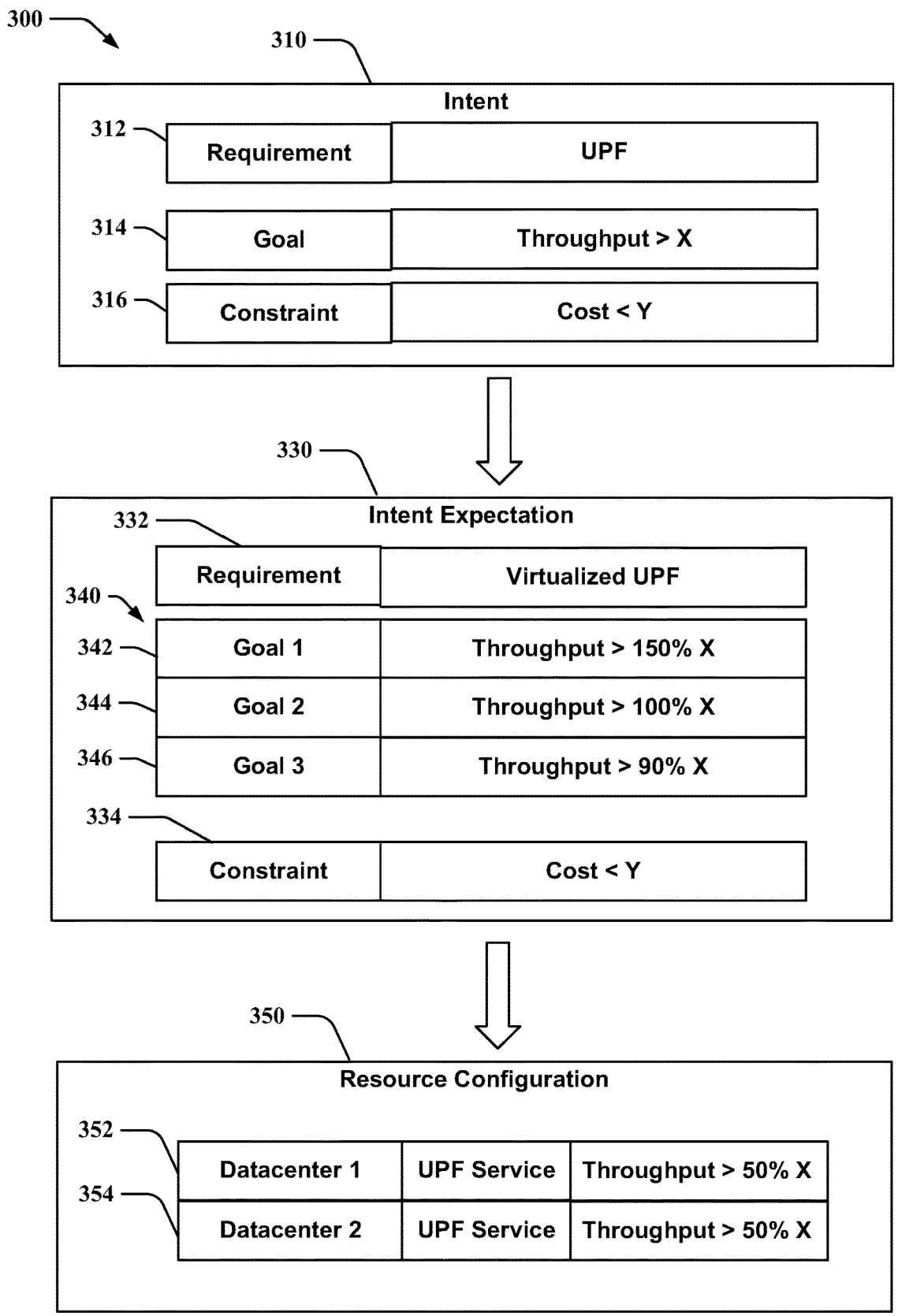
FIG. 3 is diagram of example intents, intent expectations, and resource configurations.
Figure 4:
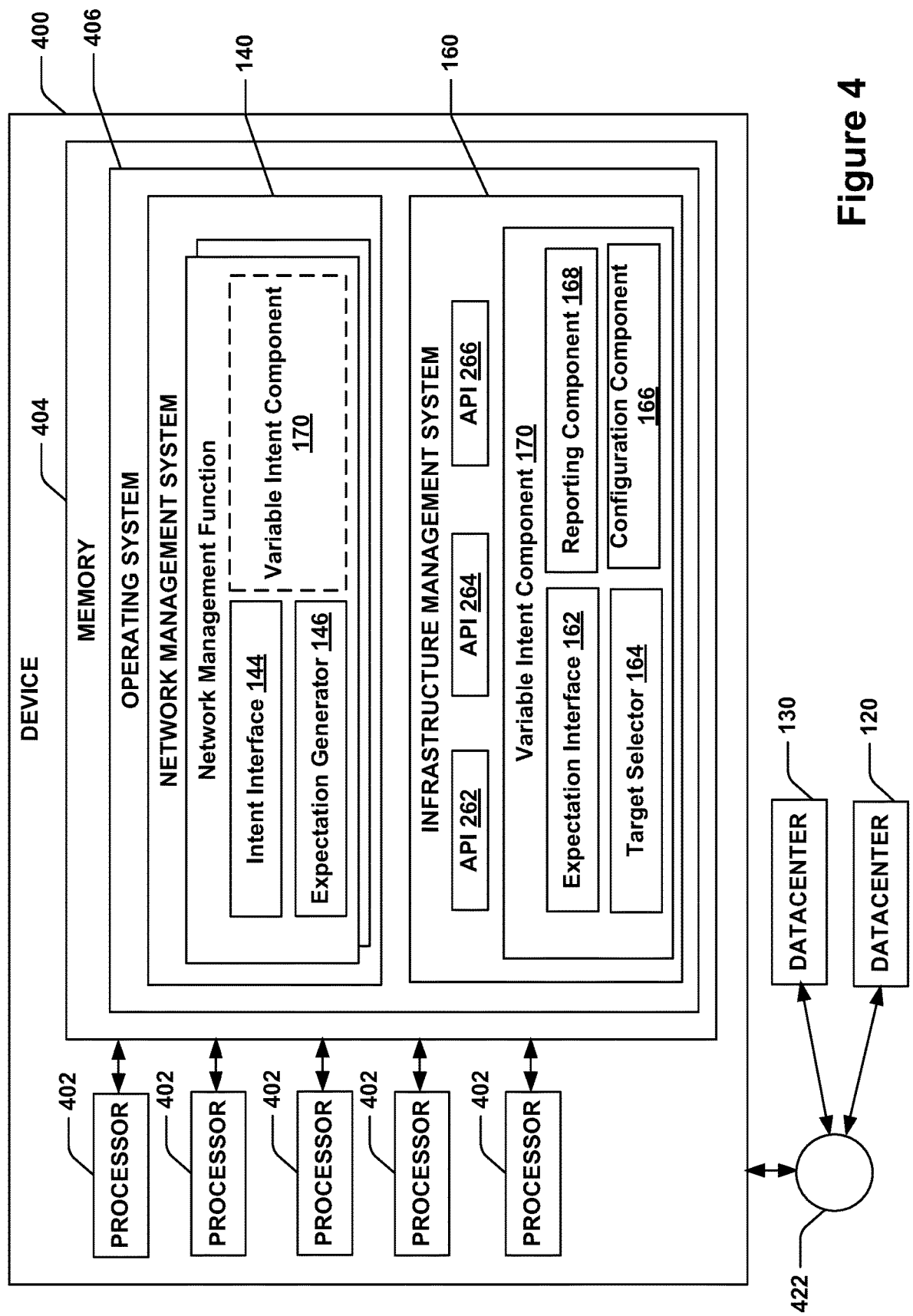
FIG. 4 is a schematic diagram of an example of a device for intent based network configuration, in accordance with aspects described herein.
Figure 5:
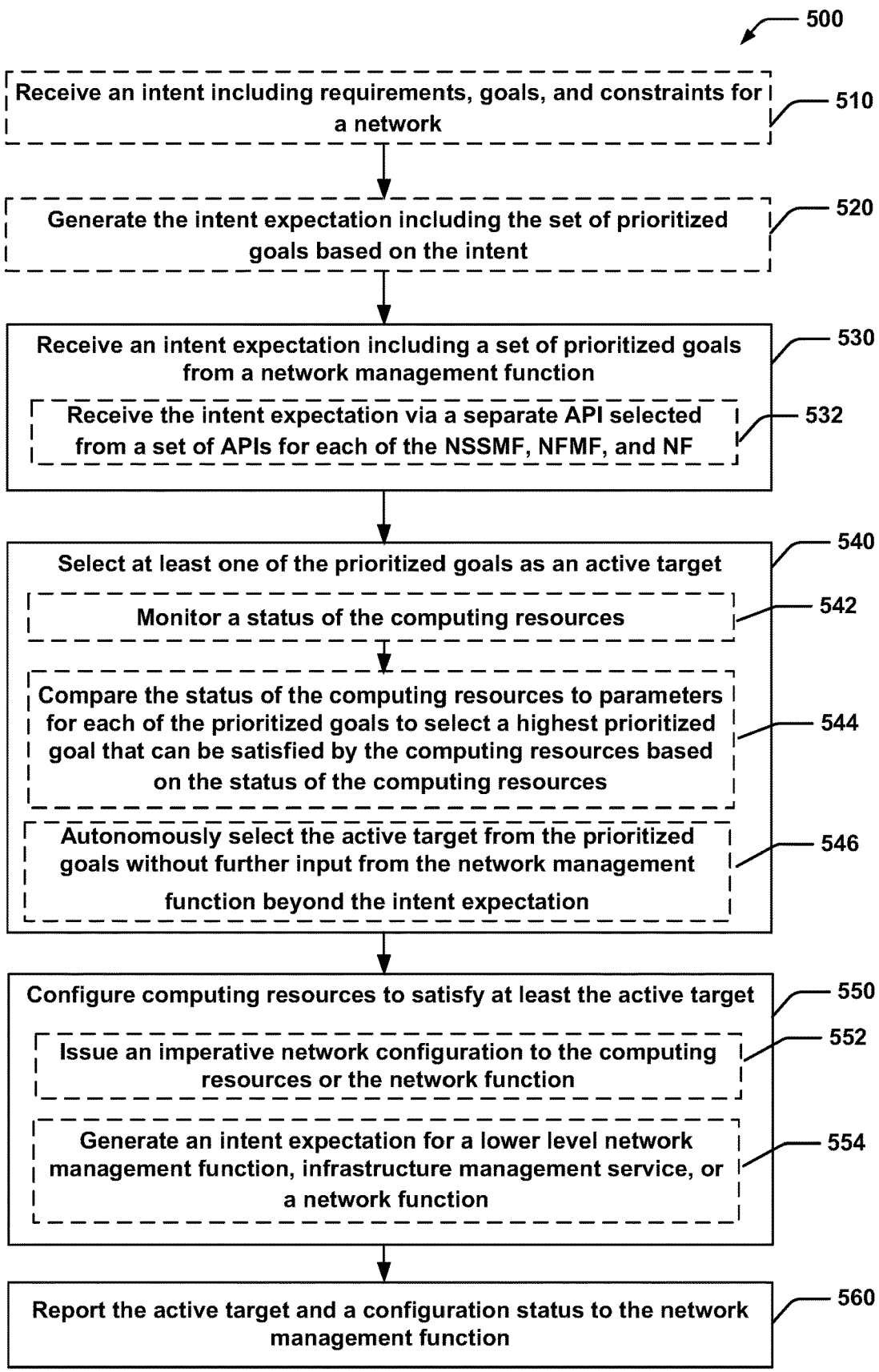
FIG. 5 is a flow diagram of an example of a method of configuring a network, in accordance with aspects described herein.
Figure 6:
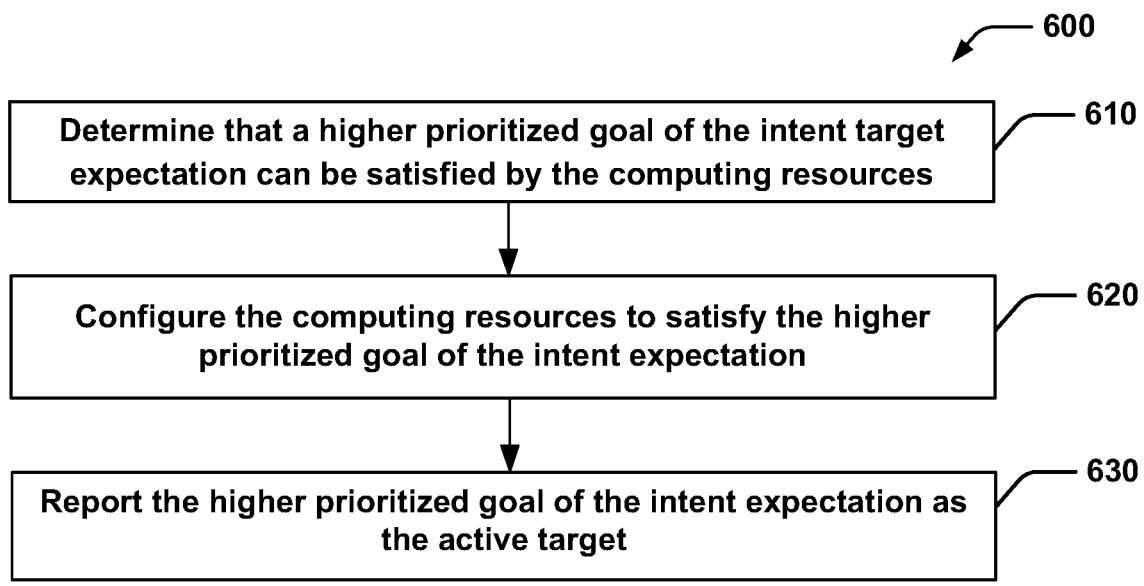
FIG. 6 is a flow diagram of a first example of a method of maintaining an intent expectation, in accordance with aspects described herein.
Figure 7:
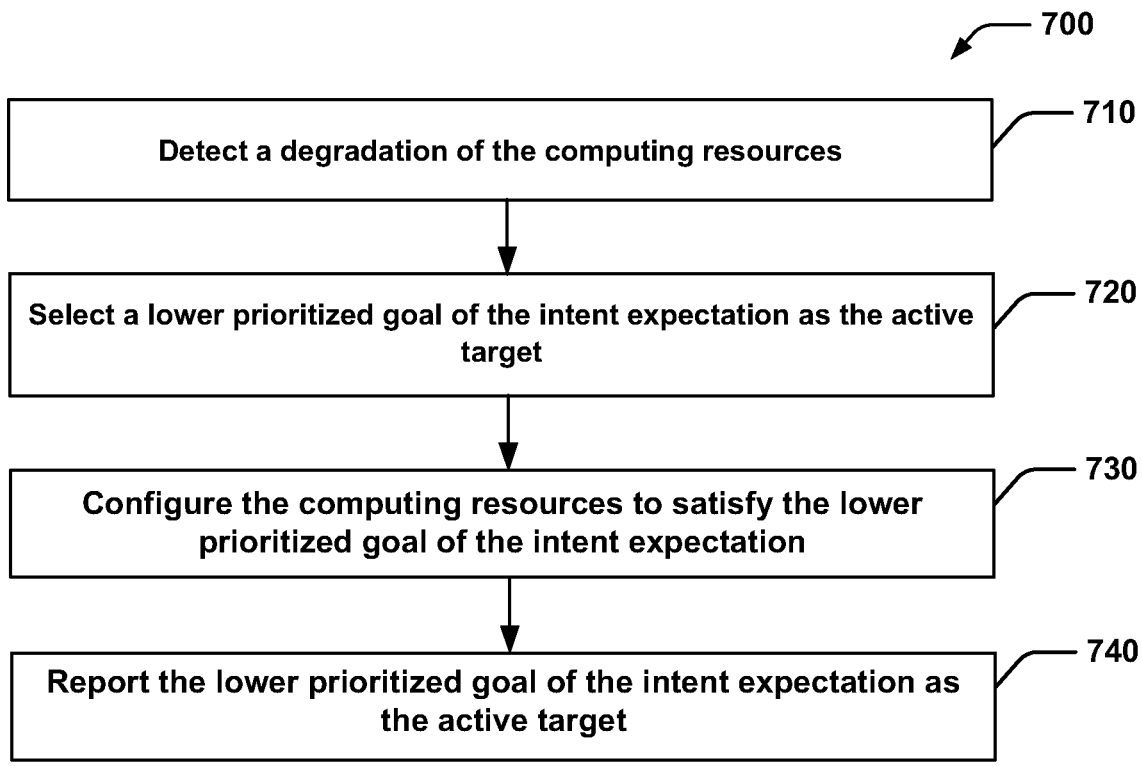
FIG. 7 is a flow diagram of a second example of a method of maintaining an intent expectation, in accordance with aspects described herein.

Turning now to FIGS. 1-8, examples are depicted with reference to one or more components and one or more methods that may perform the actions or operations described herein, where components and/or actions/operations in dashed line may be optional. Although the operations described below in FIGS. 5-7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of an architecture for management of a virtualized RAN 100. The virtualized RAN 100 may be implemented on a cloud network 105 to provide access for user equipment (UEs) 104. The virtualized RAN 100 may include radio units 110, one or more edge datacenters 120, one or more datacenters 130, a network management system 140, an infrastructure service management (ISM) system 160, and an analysis system 180.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include computing resources 122 and a switch 124, which may be connected to RUs 110 via the front-haul connections 116. The edge datacenter 120 may provide a virtualized base station for performing RAN processing for one or more cells. For example, the computing resources 122 may be hardware servers or virtual servers. The servers may be generic computing resources that can be configured to perform specific RAN protocol stacks including, for example, physical (PHY) layer, media access control (MAC) layer protocol stacks, radio link control (RLC) layer, and a radio resource control (RRC) layer. In some implementations, PHY layer processing may be more resource intensive than higher layer processing and may benefit from performance close to the RUs 110. The computing resources 122 may be connected to the switch 124 and to each other via connections, which may be wired connections such as Ethernet.

The datacenter 130 may include computing resources 132. Unlike the edge datacenter 120, the datacenter 130 may lack a direct connection to RUs 110. Generally, the datacenter 130 may be more centrally located, be connected to multiple other datacenters, and/or have greater computing resources 132 than an edge datacenter 120. In some implementations, higher layer network functions and/or core network functions may be performed at a datacenter 130. For example, the datacenter 130 may instantiate network functions such one or more Access and Mobility Management Functions (AMFs) 134, a Session Management Function (SMF) 136, and a User Plane Function (UPF) 138.

The network management system 140 may provide a network operator with tools for configuring the virtualized RAN 100. In an aspect, the network management system 140 provides intent based configuration of the virtualized RAN 100. An intent specifies the expectations including requirements, goals, and constraints for a specific service or network management workflow. An intent is typically understandable by humans, and also can be interpreted by a machine without any ambiguity. In contrast to an imperative configuration that specifies how a network or component is to perform, an intent expresses what a network should achieve. For example, an intent may express the metrics that are be achieved and not how to achieve the metrics.

In an aspect, the network management system 140 includes one or more network management functions 142. Each network management function 142 may receive an intent and output an expectation or a configuration. For example, the network management function 142 may include an intent interface 144 configured to receive an intent including requirements, goals, and constraints for a network. The network management function 142 may include an expectation generator 146 configured to generate an intent expectation including a set of prioritized goals based on the intent. For instance, where an intent is represented by metrics, the set of prioritized goals may include a minimum operational metric, a satisfactory metric, and a desired metric. In some implementations, the set of prioritized goals may be subject to the same constraint indicated in the intent.

In some implementations, the network management functions 142 are slice based network management functions arranged in a hierarchical order. For instance, the network management functions 142 may include a communication service management function (CSMF), network slice management function (NSMF), a network slice subnet management function (NSSMF), or a network function management function (NFMF). The slice based network management functions may manage on slice constituents such as a slice, a slice subnet, or a network function (NF). Each management function 142 may provide an intent expectation for a slice constituent to a lower level management function to the ISM system 160, and/or to a NF. For example, the NFMF may provide an intent expectation that the ISM system 160 provide an NF such as the AMF 134. The ISM system 160 may instantiate the AMF 134 on the network resources 132 at the datacenter 130. The NFMF may communicate with the AMF 134, for example, to configure a policy for the AMF 134 and/or monitor performance of the AMF 134. The network management functions may similarly configure other network functions of the RAN. In some implementations, the network management system 140 may be implemented on cloud resources such as a datacenter 130. In some implementations, the ISM system 160 may also be implemented on the cloud resources, and there may be a logical divide between the network management system 140 and the ISM system. In other implementations, the network management system 140 may be external to the cloud network 105 and may communicate with the ISM system 160 via a network connection.

ISM system 160 may be a system configured to manage computing resources of the cloud network 105. The cloud network 105 may support various services in addition to supporting the virtualized RAN 100. For example, the ISM system 160 may configure the cloud network 105 to provide web hosting services, virtual wide area network (WAN) services, or storage services. In an aspect, the ISM system 160 includes an intent-based interface for allocating computing resources. The ISM system 160 may be an intent-server that satisfies intent expectations provided by the network management system 140. The ISM system 160 may include a variable intent component 170 configured to satisfy intent expectations that include a set of prioritized goals. Although illustrated as a component of the ISM system 160, a network management function may also include a variable intent component 170, for example, for satisfying an intent expectation from a higher level management function.

In an aspect, the variable intent component 170 may include an expectation interface 162, a target selector 164, a configuration component 166, and a reporting component 168. The expectation interface 162 may be configured to receive an intent expectation from the network management function 142. For example, the expectation interface 162 may provide one or more application programming interfaces (APIs) that define formats of intent expectations including prioritized goals. The target selector 164 may be configured to select at least one of the prioritized goals as an active target. For example, the target selector 164 may select a highest prioritized goal that can be satisfied by the computing resources of the cloud network 105 based on a status of the computing resources (e.g., as indicated by an analysis system 180. The configuration component 166 may be configured to configure computing resources to satisfy at least the active target. For example, the configuration component 166 may instantiate a network function at a datacenter 130 or an edge datacenter 120. As another example, the configuration component 166 may configure a policy at the network function. The reporting component 168 may be configured to report the active target and configuration status to the network management function 142.

The analysis system 180 may be configured to monitor a status of the computing resources and/or network functions deployed on the computing resources. The analysis system 180 may collect metrics generated by the cloud network 105 (e.g., data rates, processor/memory utilization) and/or metrics generated by network functions (e.g., number of UEs, latency, throughput). In some implementations, the analysis system 180 may include a management data analytics function (MDAF) 180 for one or more levels of network management functions. The analysis system 180 may determine whether active targets are being satisfied. In some implementations, the analysis system 180 may determine whether alternative or potential targets could be satisfied based on network conditions. In some implementations, the analysis system 180 may be external to the ISM system 160. In other implementations, the analysis system 180 may be included in the ISM system.

Figure 2:
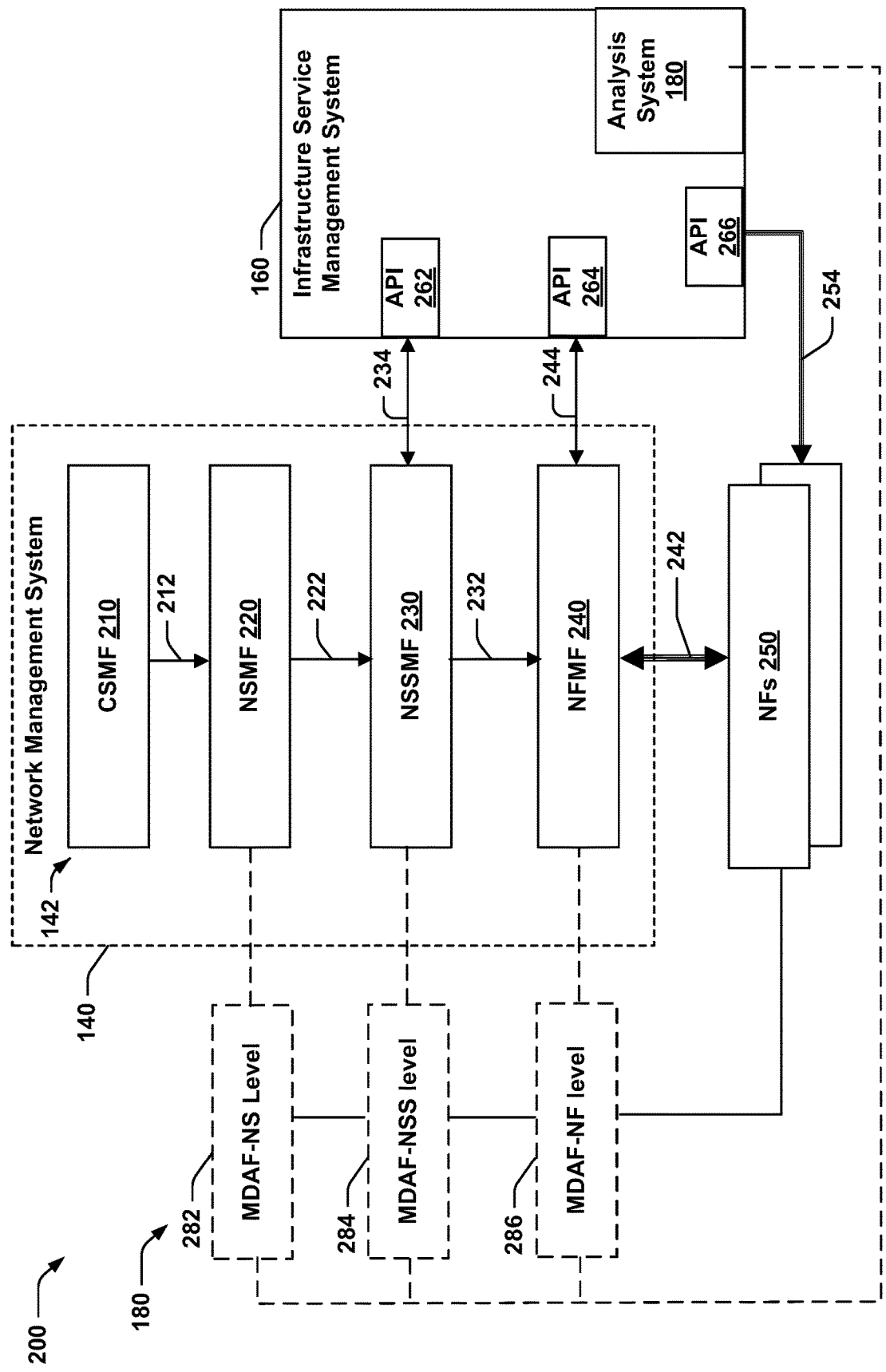
FIG. 2 is a diagram of an example of network slice based management of a virtualized RAN, in accordance with aspects described herein.

FIG. 2 is a diagram 200 of an example of network slice based management of a virtualized RAN. The network management system 140 may include hierarchical management functions 142. For example, the management functions 142 may include a CSMF 210, a NSMF 220, a NSSMF 230, a NFMF 240, and NFs 250. Each management function 142 may be an intent based management function that receives an intent from a higher level and generates an intent expectation for a lower level and/or the ISM system 160. For example, the CSMF 210 may receive an intent (e.g., for a service) from a network operator and generate an intent expectation 212 for the NSMF 220. The NSMF may receive the intent expectation 212 as a new intent (e.g., for a network slice) and generate one or more intent expectations 222 for the NSSMF (e.g., intent expectations for various subnets). The NSSMF 230 may receive the intent expectation 222 as a new intent for a subnet and generate one or more intent expectations 232 for the NFMF 240 (e.g., intent defining required network functions). The NSSMF 230 may also generate an intent expectation 234 for the ISM system 160 to implement the subnet. For example, the intent expectation 234 from the NSSMF 230 may include prioritized goals for a geographic area for the subnet. The NFMF 240 may receive the intent expectation 232 and generate intent expectations 242 for NFs 250. The NFMF 240 may also generate an intent expectation 244 for the ISM system 160. For example, the intent expectation 244 may provide prioritized goals for NF performance metrics. In some implementations, any of the NSMF 220, NSSMF 230, or NFMF 240 may include the variable intent component 170 for satisfying a received intent expectation that includes prioritized goals. Any of the intent expectations 212, 222, or 232 may include prioritized goals.

The ISM system 160 may include different APIs 262, 264 for different network management functions. For example, the ISM system 160 may receive the intent expectation 234 via the API 262 or receive the intent expectation 244 via the API 264. In some implementations, each API 262, 264 may be an example of the expectation interface 162 that defines relevant goals for the respective level of intent expectation. The ISM system 160 may include a separate API 266 for sending a configuration 254 to a NF 250. The API 266 may be a non-intent based interface for sending an imperative configuration. In some implementations (e.g., where a network management function includes a variable intent component 170), the API 262 and/or the API 264 may be a non-intent based interface that receives a configuration from the NSSMF 230 or NFMF 240, respectively.

In some implementations, MDAFs 182 may operate at various levels corresponding to the hierarchical network management functions 142 (e.g., MDAF-NS level 282, MDAF-NSS level 284, and MDAF-NF level 286). An MDAF may provide analysis to the corresponding hierarchical network management functions 142, which may change a configuration based on the analysis. In some implementations, (e.g., where a network management function includes a variable intent component 170), the MDAF may provide analysis regarding whether a prioritized goal can be satisfied and/or select a prioritized goal based on the analysis. In some implementations, the MDAFs 182 may provide analysis to the ISM system 160 or the associated analysis system 180. The ISM system 160 may modify a network configuration based on the analysis (e.g., by changing an active target). Accordingly, providing MDAF analysis to the ISM system 160 may shorten a feedback loop and allow faster responses to changing network conditions.

FIG. 3 is diagram 300 of example intents 310, intent expectations 330, and resource configurations 350. For instance, the intent 310 may correspond to the intent expectation 232 received at the NFMF 240, the intent expectation 330 may correspond to the intent expectation 244 received at the ISM system 160, and the resource configuration 350 may correspond to a configuration delivered to the datacenter 130 or edge datacenter 120.

The intent 310 may include a requirement 312, a goal 314, and a constraint 316. For example, the intent 310 may be an intent for establishing a UPF 138 as indicated by the requirement 312. The intent 310 may be generated by the NSSMF 230. The intent 310 may have a goal of achieving a throughput greater than X, which may be selected by the NSSMF 230, for example, based on a higher level intent expectation 222. The intent 310 may have a constraint of a cost less than Y, which may also be selected by the NSSMF 230.

The NFMF 240 may receive the intent 310 and generate an intent expectation 330. The intent expectation 330 may include a requirement 332, a set of prioritized goals 340, and a constraint 334. For example, the NFMF 240 may determine that the UPF 138 should be implemented by the cloud network 105 and generate the intent expectation 330 for the ISM system 160. The set of prioritized goals 340 may be based on the goal 314. For example, the NFMF 240 may select performance goals based on a percentage of the goal 314. For example, an enhanced goal 342 may specify a performance level greater than requested in the intent 310, a standard goal 344 equal to the performance level requested in the intent 310, and a minimum acceptable goal 346 less than requested in the intent 310. The NFMF 240 may select the particular prioritized goals based on the particular metric and the specificity of the intent 310. The constraint 334 may be the same as the constraint 316. In some implementations, the constraint 334 may be a prioritized constraint associated with each prioritized goal 340. For instance, a prioritized constraint may allow relaxation of the constraint for an enhanced goal.

The ISM system 160 may receive the intent expectation 330 and generate a resource configuration 350. The resource configuration 350 may be based on available computing resources within the cloud network 105 and a status of the computing resources. For instance, the ISM system 160 may receive feedback from the datacenters 120, 130 regarding available resources as well as the performance of the resources for other applications. For instance, the ISM system 160 may have information about network or resource outages. The ISM system 160 may select at least one of the prioritized goals 340 as an active target. For example, the ISM system 160 may select a highest prioritized goal that can be satisfied by the computing resources of the cloud network 105 based on the status of the computing resources. The ISM system 160 may also consider the constraint 334 when selecting a prioritized goal 340. For instance, if the cloud network 105 has sufficient resources to satisfy the goal 342 but doing so would violate the constraint 334 (e.g., cost too much), the ISM system 160 may select the goal 344.

The resource configuration 350 may be a configuration of computing resources within the cloud network 105. For example, the resource configuration 350 may configure a first instance 352 of a UPF service at a first datacenter 130 and a second instance 354 of a UPF service at a second datacenter 130. In this example, the resource configuration 350 may allocate sufficient resources such that each instance handles at least 50% of the active target, but the resource allocation may vary based on the status of the resources. Accordingly, the ISM system 160 may configure computing resources to satisfy the active target. The ISM system 160 may report the active target and the configured resources to the network management function (e.g., the NFMF 240) via the API 264.

In an aspect, the ISM system 160 may continue to monitor the status of the network resources and/or the performance of the configured NFs 250. For instance, the ISM system 160 may determine that a higher prioritized goal of the intent expectation 330 (e.g., goal 342) can be satisfied by the computing resources. The ISM system 160 may configure the computing resources (e.g., generate a new resource configuration 350) to satisfy the higher prioritized goal 342. The ISM system 160 may then report the higher prioritized goal 342 as the active target, for example, via the API 264. Conversely, if the ISM system 160 detects a degradation of the computing resources, the ISM system 160 may select a lower prioritized goal 346 of the intent expectation 330 as the active target. The ISM system 160 may configure the computing resources to satisfy the lower prioritized goal 346 of the intent expectation 330 and report the lower prioritized goal 346 of the intent expectation 330 as the active target. Accordingly, the ISM system 160 may adjust the configuration of network resources to satisfy a selected prioritized goal without needing to receive an updated intent expectation 330 from the network management function.

FIG. 4 is a schematic diagram of an example of a device 400 (e.g., a computing device) for network configuration. The device 400 may be an example of a computing resource 132 such as a server at a datacenter 130 that hosts the network management system 140 and/or the ISM system 160. The device 400 is connected to other servers within the datacenter via a switch 422 and may be connected to servers at other datacenters.

In an example, device 400 can include one or more processors 402 and/or memory 404 configured to execute or store instructions or other parameters related to providing an operating system 406, which can execute one or more applications or processes, such as, but not limited to, at least one of a network management function 142 or an ISM system 160 including a variable intent component 170. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the network management system 140 may optionally include one or more network management functions 142 (e.g., CSMF 210, NSMF 220, NSSMF 230, NFMF 240, or NFs 250), each network management function 142 including an intent interface 144 and an expectation generator 146. The network management system 140 and/or a network management function 142 may optionally include a variable intent component 170 for satisfying an intent expectation received from a higher level network management function that includes prioritized goals.

In an example, the ISM system 160 may include a variable intent component 170 that includes one or more of the expectation interface 162, target selector 164, configuration component 166, or reporting component 168. In some implementations, the ISM system 160 may optionally include one or more of the APIs 262, 264, or 266 for communication with one or more of the network management functions 142. In some implementations, the expectation interface 162 may receive an intent expectation 330 via one of the APIs 262 or 264, and the reporting component 168 may report an active target or configuration status via the one of the APIs 262 or 264.

FIG. 5 is a flow diagram of an example of a method 500 for network configuration based on an intent with prioritized goals. For example, the method 500 can be performed by a device 400 and/or one or more components thereof to instantiate one or more network functions 250 within a cloud network 105 to provide a network service. For instance, the method 500 may be performed by a device implementing any of an NSMF 220, NSSMF 230, NFMF 240, ISM system 160, or NF 250 that includes a variable intent component 170.

At block 510, the method 500 may optionally include receiving an intent including requirements, goals, and constraints for a network. In an example, the intent interface 144 of a network management function 142, e.g., in conjunction with processor 402, memory 404, and operating system 406, can receive an intent 310 including requirements 312, goals 314, and constraints 316 for a network.

At block 520, the method 500 may optionally include generating an intent expectation including a set of prioritized goals based on the intent. In an example, the expectation generator 146 of the network management function 142, e.g., in conjunction with processor 402, memory 404, and operating system 406, can generate the intent expectation 330 including the set of prioritized goals 340 based on the intent 310.

At block 530, the method 500 includes receiving an intent expectation including a set of prioritized goals from a network management function. In an example, the expectation interface 162 of the variable intent component 170, e.g., in conjunction with processor 402, memory 404, and operating system 406, can receive the intent expectation 330 including the set of prioritized goals 340 from a network management function 142. In some implementations, at block 532 the block 530 may optionally include receiving the intent expectation via a separate API selected from a set of APIs (e.g., APIs 262 or 264) for each of the NSSMF 230 or NFMF 240.

At block 540, the method 500 includes selecting at least one of the prioritized goals as an active target. In an example, the target selector 164 of the variable intent component 170, e.g., in conjunction with processor 402, memory 404, and operating system 406, can select at least one of the prioritized goals 340 as an active target. In an aspect, the target selector 164 may select a highest prioritized goal of the prioritized goals that can be satisfied by a set of computing resources as the active target based on a comparison between a status of the computing resources to parameters for each of the prioritized goals. For example, in some implementations, at sub-block 542, the block 540 may optionally include monitoring a status of the computing resources 122 (e.g., at datacenters 120, 130). For instance, the variable intent component 170 may include or communicate with the analysis system 180 or an MDAF 282, 284, 286 to monitor the status of the computing resources 122. At sub-block 544, the block 540 may optionally include comparing the status of the computing resources to parameters for each of the prioritized goals to select a highest prioritized goal that can be satisfied by the computing resources based on the status of the computing resources. In some implementations, at sub-block 546, the block 540 may optionally include autonomously selecting the active target from the prioritized goals 340 without further input from the network management function 142 beyond the intent expectation 330.

At block 550, the method 500 includes configuring computing resources to satisfy at least the active target. In an example, the configuration component 166 of the variable intent component 170, e.g., in conjunction with processor 402, memory 404, and operating system 406, can configure computing resources 122, 132 (e.g., at datacenters 120, 130) to satisfy at least the active target. In some implementations, at sub-block 552, the configuration component 166 may issue an imperative (i.e., non-intent based) network configuration to the computing resources and/or the network function 250. For instance, the NFMF 240 may issue a policy to one or more NFs 250 via the interface 242. In some implementations, at sub-block 554, the block 550 may include generating an intent expectation for a lower level network management function, infrastructure management service, or a network function. For instance, the NFMF 240 may issue the intent expectation 330 to the ISM system 160.

At block 560, the method 500 reporting the active target and a configuration status to the network management function. In an example, the reporting component 168 of the variable intent component 170, e.g., in conjunction with processor 402, memory 404, and operating system 406, can report the active target and a configuration status to the network management function 142. In some implementations, the reporting component 168 may report the active target and the configuration status via the respective API for the network management function (e.g., API 262, 264, or 266).

FIG. 6 is a flow diagram of an additional optional method 600 for maintaining an intent expectation including prioritized goals. For example, the method 600 can be performed after the method 500 by the device 400 and/or one or more components thereof (e.g., the variable intent component 170) to modify an active target for the intent expectation 330.

At block 610, the method 600 may include determining that a higher prioritized goal of the intent target expectation can be satisfied by the computing resources. For example, in some implementations, the variable intent component 170 may communicate with the analysis system 180 to determine that the higher prioritized goal (e.g., goal 342) of the intent target expectation 330 can be satisfied by the computing resources 122, 132. At block 620, the method 600 may include configuring the computing resources to satisfy the higher prioritized goal of the intent expectation. For example, the configuration component 166 may configure the computing resources 122, 132 to satisfy the higher prioritized goal 342 of the intent expectation 330. At block 630, the method 600 may include reporting the higher prioritized goal of the intent expectation as the active target. For example, the reporting component 168 may report the higher prioritized goal 342 of the intent expectation 330 as the active target.

FIG. 7 is a flow diagram of an additional optional method 700 for maintaining an intent expectation including prioritized goals. For example, the method 700 can be performed after the method 500 by the device 400 and/or one or more components thereof (e.g., the variable intent component 170) to modify an active target for the intent expectation 330.

At block 710, the method 700 may include detecting a degradation of the computing resources. For example, in some implementations, the variable intent component 170 may communicate with the analysis system 180 to detect a degradation of the computing resources 122, 132. At block 720, the method 700 may include selecting a lower prioritized goal of the intent expectation as the active target. For example, the target selector 164 may select a lower prioritized goal (e.g., goal 346) of the intent expectation 330 as the active target based on the status of the computing resources as determined by the analysis system 180. At block 730, the method 700 may include configuring the computing resources to satisfy the lower prioritized goal of the intent expectation. For example, the configuration component 166 may configure the computing resources 122, 132 to satisfy the lower prioritized goal 346 of the intent expectation 330. At block 740, the method 700 may include reporting the lower prioritized goal of the intent expectation as the active target. For example, the reporting component 168 may report the lower prioritized goal 346 of the intent expectation 330 as the active target.

Figure 8:
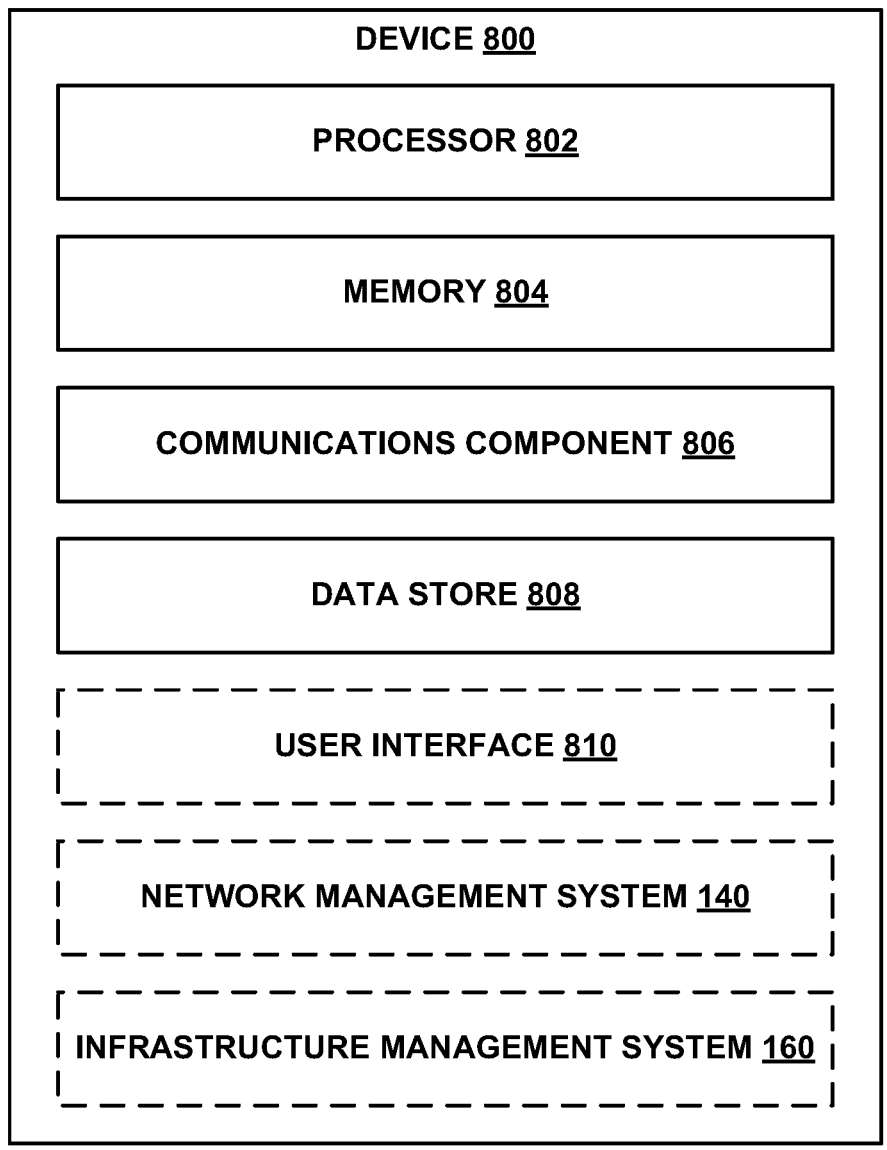
FIG. 8 is a schematic diagram of an example of a device for performing functions described herein, in accordance with aspects described herein.

FIG. 8 illustrates an example of a device 800 including additional optional component details as those shown in FIG. 4. In one aspect, device 800 may include processor 802, which may be similar to processor 402 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 404 such as for storing local versions of operating systems (or components thereof) and/or applications being executed by processor 802, such as the network management system 140, the ISM system 160, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc.) not currently being executed by processor 802. In addition, data store 808 may be a data repository for network management system 140, ISM system 160, etc.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include a network management system 140 for providing an intent expectation including prioritized goals, an ISM system 160 for configuring network resources based on the intent expectation, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A system for network configuration, comprising:
a network management function configured to:
receive an intent including requirements, goals, and constraints for a network; and
generate an intent expectation including a set of prioritized goals based on the intent, each goal of the set of prioritized goals including a respective value for a same parameter as the other goals of the set of prioritized goals, wherein the network management function includes one or more of a network slice management function (NSMF), network slice subnet management function (NSSMF), or network function management function (NFMF); and
an infrastructure service management (ISM) system, wherein the ISM system includes a separate application programming interface (API) for each of the NSSMF, the NFMF, and a network function (NF), wherein the ISM system is configured to:
receive the intent expectation from the NSSMF via a first API or the NFMF via a second API, the received intent expectation including the set of prioritized goals based on the intent;
select a highest prioritized goal of the set of prioritized goals that can be satisfied by a set of computing resources controlled by the ISM system as an active target based on a comparison between a status of the set of computing resources to the respective value of the parameter for each goal of the set of prioritized goals;
configure the set of computing resources to satisfy at least the active target by sending an imperative configuration via a third interface to the network function; and
report the active target and a configuration status to the network management function to the NSSMF via a first API or the NFMF via the second API.

2. The system of claim 1, wherein the ISM system is configured to:
determine that a higher prioritized goal of the intent expectation can be satisfied by the set of computing resources;
configure the set of computing resources to satisfy the higher prioritized goal of the intent expectation; and report the higher prioritized goal of the intent expectation as the active target.

3. The system of claim 1, wherein the ISM system is configured to:
  detect a degradation of the set of computing resources;
  select a lower prioritized goal of the intent expectation as the active target;
  configure the set of computing resources to satisfy the lower prioritized goal of the intent expectation; and
  report the lower prioritized goal of the intent expectation as the active target.

4. The system of claim 1, wherein the intent expectation is for a constituent of a network slice of a radio access network.

5. The system of claim 1, wherein the ISM system is configured to autonomously select the active target from the set of prioritized goals without further input from the network management function beyond the intent expectation.

6. A method of network configuration, comprising:
  receiving, at an infrastructure service management (ISM) system via an application programming interface (API), an intent expectation including a set of prioritized goals from a network management function, each goal of the set of prioritized goals including a respective value for a same parameter as the other goals of the set of prioritized goals, wherein the intent expectation is received from a network management function that includes one or more of a network slice management function (NSMF), a network slice subnet management function (NSSMF), or a network function management function (NFMF), wherein the ISM system includes a separate API for each of the NSSMF, the NFMF, and a network function (NF), and wherein the intent expectation is received from the NSSMF via a first API or the NFMF via a second API, the received intent expectation including the set of prioritized goals based on an intent at the network management function;
  selecting, at the ISM system, a highest prioritized goal of the set of prioritized goals that can be satisfied by a set of computing resources as an active target based on a comparison between a status of the set of computing resources to the respective value of the parameter for each goal of the set of prioritized goals;
  configuring the set of computing resources to satisfy at least the active target of the intent expectation by sending an imperative configuration via a third interface to the network function; and
  reporting the active target and a configuration status from the ISM system to the network management function to the NSSMF via a first API or the NFMF via the second API.

7. The method of claim 6, further comprising:
  determining that a higher prioritized goal of the intent expectation can be satisfied by the set of computing resources;
  configuring the set of computing resources to satisfy the higher prioritized goal of the intent expectation; and
  reporting the higher prioritized goal of the intent expectation as the active target.

8. The method of claim 6, further comprising:
  detecting a degradation of the set of computing resources;
  selecting a lower prioritized goal of the intent expectation as the active target;
  configuring the set of computing resources to satisfy the lower prioritized goal of the intent expectation; and
  reporting the lower prioritized goal of the intent expectation as the active target.

9. The method of claim 6, wherein the intent expectation is for a constituent of a network slice of a radio access network.

10. The method of claim 6, wherein selecting the highest prioritized goal of the set of prioritized goals as the active target comprises autonomously selecting the active target from the set of prioritized goals without further input from the network management function beyond the intent expectation.

11. The method of claim 6, further comprising, at a network management function:
  receiving an intent including requirements, goals, and constraints for a network; and
  generating the intent expectation including the set of prioritized goals based on the intent.

12. The method of claim 6, wherein configuring the set of computing resources to satisfy at least one of the set of prioritized goals of the intent expectation comprises generating an intent expectation for a lower level network management function, infrastructure management service, or a network function.

13. A non-transitory computer-readable medium storing computer executable instructions, that when executed by a processor, cause the processor to:
  receive, at an infrastructure service management (ISM) system via an application programming interface (API), an intent expectation including a set of prioritized goals from a network management function, each goal of the set of prioritized goals including a respective value for a same parameter as the other goals of the set of prioritized goals, wherein the intent expectation is received from a network management function that includes one or more of a network slice management function (NSMF), a network slice subnet management function (NSSMF), or a network function management function (NFMF), wherein the ISM system includes a separate API for each of the NSSMF, the NFMF, and a network function (NF), and wherein the intent expectation is received from the NSSMF via a first API or the NFMF via a second API, the received intent expectation including the set of prioritized goals based on an intent at the network management function;
  select, at the ISM system, a highest prioritized goal of the set of prioritized goals that can be satisfied by a set of computing resources as an active target based on a comparison between a status of the set of computing resources to the respective value of the parameter for each goal of the set of prioritized goals;
  configure the set of computing resources to satisfy at least one of the set of prioritized goals of the intent expectation by sending an imperative configuration via a third interface to the network function; and
  report the active target and a configuration status from the ISM system to the network management function to the NSSMF via a first API or the NFMF via the second API.

14. The non-transitory computer-readable medium of claim 13, further comprising instructions to determine that a higher prioritized goal of the intent expectation can be satisfied by the set of computing resources;
  configure the set of computing resources to satisfy the higher prioritized goal of the intent expectation; and
  report the higher prioritized goal of the intent expectation as the active target.

15. The non-transitory computer-readable medium of claim 13, further comprising instructions to:
  detect a degradation of the set of computing resources;
  select a lower prioritized goal of the intent expectation as the active target;
  configure the set of computing resources to satisfy the lower prioritized goal of the intent expectation; and
  report the lower prioritized goal of the intent expectation as the active target.

* * * * *